(12) United States Patent
Zeng

(10) Patent No.: US 9,459,723 B2
(45) Date of Patent: Oct. 4, 2016

(54) DETECTION ALGORITHM FOR AN INFRARED PROXIMITY SENSOR OF A TOUCH SCREEN MOBILE PHONE

(71) Applicant: GUANG DONG OPPO MOBILE TELECOMMUNICATIONS CORP., LTD., Guangdong (CN)

(72) Inventor: Yuanqing Zeng, Guangdong (CN)

( * ) Notice: Subject to any disclaimer, the term of this patent is extended or adjusted under 35 U.S.C. 154(b) by 670 days.

(21) Appl. No.: 13/979,645

(22) PCT Filed: Sep. 29, 2012

(86) PCT No.: PCT/CN2012/082461
§ 371 (c)(1),
(2) Date: Jul. 12, 2013

(87) PCT Pub. No.: WO2013/166803
PCT Pub. Date: Nov. 14, 2013

(65) Prior Publication Data
US 2016/0179265 A1   Jun. 23, 2016

(30) Foreign Application Priority Data

May 8, 2012 (CN) .......................... 2012 1 0139955

(51) Int. Cl.
| | | |
|---|---|---|
| G06F 3/041 | (2006.01) | |
| G06F 1/32 | (2006.01) | |
| G06F 3/03 | (2006.01) | |
| H04M 1/725 | (2006.01) | |

(52) U.S. Cl.
CPC ........... *G06F 3/0416* (2013.01); *G06F 1/3231* (2013.01); *G06F 3/0304* (2013.01); *H04M 1/72519* (2013.01); *G06F 2203/04108* (2013.01); *H04M 2250/12* (2013.01); *H04M 2250/22* (2013.01); *Y02B 60/1289* (2013.01)

(58) Field of Classification Search
CPC ............... G06F 3/0416; G06F 3/0304; G06F 2203/04108; G06F 1/3231; H04M 1/72519; H04M 2250/12; H04M 2250/22; Y02B 60/1289
USPC ........................................................ 345/173
See application file for complete search history.

(56) References Cited

U.S. PATENT DOCUMENTS

| | | | |
|---|---|---|---|
| 2013/0005303 A1* | 1/2013 | Song .................. | A61B 5/02438 455/411 |
| 2014/0240292 A1* | 8/2014 | Zeng ........................ | G06F 3/01 345/175 |
| 2015/0268025 A1* | 9/2015 | Huang .................... | G01P 15/00 702/150 |

* cited by examiner

*Primary Examiner* — Dmitriy Bolotin
(74) *Attorney, Agent, or Firm* — Prakash Nama; Global IP Services, PLLC

(57) ABSTRACT

A detection algorithm for an infrared proximity sensor of a touch screen mobile phone is provided. The working principle is that, during the call, the detection algorithm detects the magnitude of the energy received by the infrared proximity sensor in real time, judges the proximity action or departure action according to the change trend, and adjusts the proximity and departure threshold values in real time to control the mobile phone screen to turn off and on. Said algorithm can avoid influences of the component consistency, structural consistency and other outside interference factors of the mobile phone on the infrared proximity detection, and solve the problem of malfunction due to aging of the IR-LED infrared emitter tube and clearance change caused by dropping of the mobile phone. The algorithm is widely applicable.

3 Claims, 1 Drawing Sheet

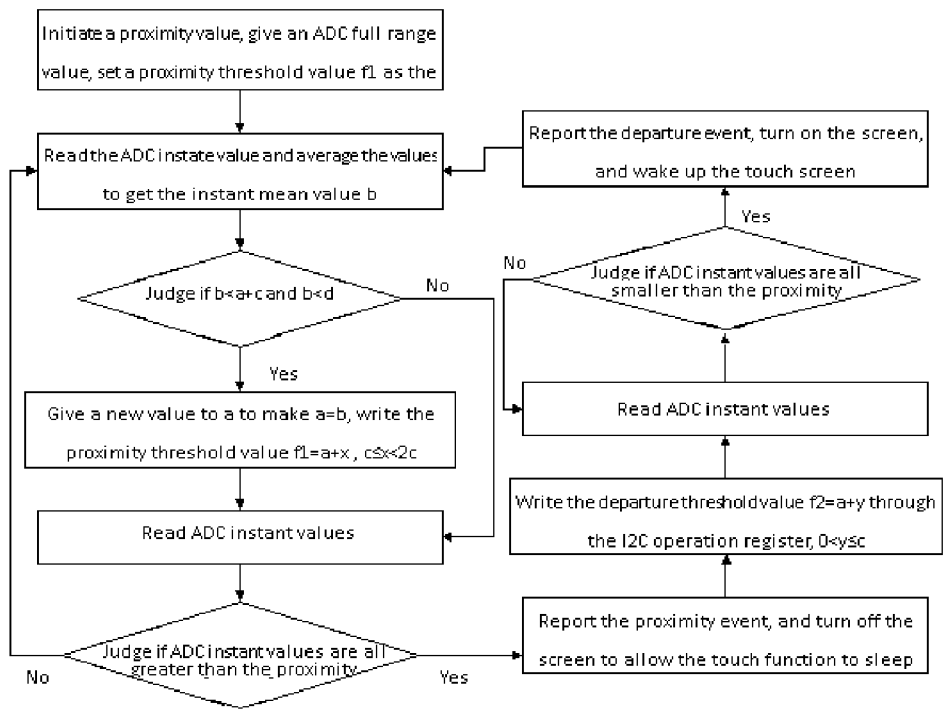

DETECTION ALGORITHM FOR AN INFRARED PROXIMITY SENSOR OF A TOUCH SCREEN MOBILE PHONE

BACKGROUND OF THE INVENTION

The present invention relates to an infrared detection algorithm, in particular to a detection algorithm for an infrared proximity sensor of a touch screen mobile phone.

Primarily based on the emitting and receiving principle of the infrared light pulse, the infrared proximity sensor judges the proximity of an object by the energy magnitude of the reflected infrared light which is received by the infrared photosensitive diode. The majority of the touch screen mobile phones available on the market are equipped with the infrared proximity sensor to control the turning on and off of the touch screen during the call, thus avoiding misoperation caused by facial interference with the touch screen in this time. The currently used proximity detection method is as follows: set proximity and departure threshold values; when the value received by the photoelectric diode is greater than this proximity threshold value, make the judgment of proximity, turn off the touch screen; when the value received by the photoelectric diode is smaller than the departure threshold value, make the judgment of departure, and turn on the touch screen.

The majority of the machines available on the market that adopt the above proximity detection method cannot solve the following problems: 1, due to low reflectivity of a black object, when black hairs are close to or adhered to the touch screen, the infrared proximity sensor cannot reliably identify if there is proximity action and therefore cannot reliably turn off the screen; 2, if the screen corresponding to the proximity sensor is adhered with a protective film or has smudges (such as greasy dirty, sweat, cosmetic, etc), it fails to function as usual or judge the proximity and departure actions because the distance threshold values are different from those in case of no protective film and smudges, and the sensitivity of the infrared proximity sensor will be reduced.

BRIEF SUMMARY OF THE INVENTION

To overcome the defects in the prior art, the present invention provides a detection algorithm for an infrared proximity sensor of a touch screen mobile phone so as to avoid influences of the component consistency and structural consistency of the mobile phone and other outside interference factors on the infrared proximity detection in a call.

The present invention is realized by the following technical scheme: A detection algorithm for an infrared proximity sensor of a touch screen mobile phone is provided; based on the infrared proximity sensing technology, said detection algorithm is switched on immediately at the moment of the startup of the call function of the mobile phone and switched off at the moment when the call is cut off; said detection algorithm comprises:

step 1, initiating a proximity value a, giving an ADC full range value to the infrared proximity sensor, meanwhile setting a proximity threshold value f1 as the ADC full range value and a departure threshold value f2 as 0;

step 2, reading the ADC instate value output by the infrared proximity sensor and averaging the values to get the instant mean value b;

step 3, judging if $b < a+c$ and $b < d$, executing step 4; otherwise, executing step 5, wherein c represents the proximity trend value; d represents the maximum proximity effective value; c and d both are system set values;

step 4, giving a new value to a to make $a=b$, adjusting the system proximity value f1 to $a+x$, writing the proximity threshold value f1 through an I2C operation register, wherein x is the proximity compensation value set in system, and $c \leq x < 2c$;

step 5, reading ADC instant values, meanwhile judging if the ADC instant values are all greater than the proximity threshold value f1, if so, entering step 6; otherwise, returning to step 2;

step 6, reporting a proximity event, turning off the screen to allow the touch function to sleep, adjusting the departure threshold f2 of the system to $a+y$, and writing the departure threshold f2 through the I2C operation register, wherein y is the departure compensation value set in the system, and $0 < y \leq c$;

step 7, reading ADC instant values, meanwhile judging if the ADC instant values are all smaller than the departure threshold value f2 set in step 6, if so, entering step 8; otherwise, repeating step 7;

step 8, reporting the departure event, turning on the screen, waking up the touch screen and turn to step 2.

Said proximity trend value c, maximum proximity effective value d, proximity compensation value x, and departure compensation value y are all fixed values, adjusted according to the system.

Furthermore, in said step 2, step 5 and step 7, ADC instant values are read at least two consecutive times respectively.

Compared with the prior art, the present invention adopts the algorithm of adjusting the proximity threshold value and departure threshold value in real time during the call. The present invention has the following advantages: 1, even if the mobile phones are different, the algorithm system always keeps consistent in judgment on the proximity and departure actions of the same object; 2, even if the mobile phone screen is adhered with a protective film or covered with smudges such as greasy dirt, sweat and cosmetic or interfered by other outside factors, the algorithm system still works and always keeps consistent in judgment on the proximity and departure actions of the same object; 3, when black substances such as black hairs touch the screen, this algorithm still can work normally; 4, the problem of malfunction due to aging of the IR-LED emitter tube and tiny change of the clearance between the lower surface of the screen mirror and the upper surface of the proximity IC caused by dropping of the mobile phone can be solved; 5, this algorithm is widely applicable and is not required to set unique threshold values for each mobile phone.

BRIEF DESCRIPTION OF THE DRAWINGS

FIG. 1 is the flowchart of the algorithm of the present invention.

DETAILED DESCRIPTION OF THE INVENTION

To facilitate understanding of those skilled in this field, the present invention is further described with reference to the attached drawings.

A detection algorithm for an infrared proximity sensor of a touch screen mobile phone is provided, as shown in FIG. 1. Based on the infrared proximity sensing technology, said detection algorithm is switched on immediately at the moment of startup of the call function of the mobile phone and switched off at the moment when the call is cut off; said detection algorithm comprises:

step 1, initiating a proximity value a through the software, giving an ADC full range value to the infrared proximity sensor, meanwhile setting a proximity threshold value f1 as the ADC full range value and a departure threshold value f2 as 0;

step 2, reading the ADC instate value output by the infrared proximity sensor and averaging the values to get the instant mean value b;

step 3, judging if b<a+c and b<d, executing step 4; otherwise, executing step 5, wherein c represents the proximity trend value; d represents the maximum proximity effective value; c and d both are system set values;

step 4, giving a new value to a to make a=b, adjusting the system proximity value f1 to a+x, writing the proximity threshold value f1 through an I2C operation register, wherein x is the proximity compensation value set in system, and c≤x<2c;

step 5, reading ADC instant values, meanwhile judging if the ADC instant values are all greater than the proximity threshold value f1, if so, entering step 6; otherwise, returning to step 2;

step 6, reporting a proximity event, turning off the screen to allow the touch function to sleep, adjusting the departure threshold f2 of the system to a+y, and writing the departure threshold f2 through the I2O operation register, wherein y is the departure compensation value set in the system, and 0<y≤c;

step 7, reading ADC instant values, meanwhile judging if the ADC instant values are all smaller than the departure threshold value f2 set in step 6, if so, entering step 8; otherwise, repeating step 7;

step 8, reporting the departure event, turning on the screen, waking up the touch screen and turning to step 2.

Said proximity trend value c, maximum proximity effective value d, proximity compensation value x and departure compensation value y are all fixed values, adjusted according to the system.

When an object approaches to the mobile phone, the reference value of the difference between the value detected by the proximity sensor at the current time and the value obtained at the previous time is called proximity trend value c. In the approaching process of the object, only when the difference between the current value and the previous value is greater than the proximity trend value c, which means that the object is approaching, the set proximity threshold value f1=a+x works; otherwise, it needs to enter step 4 and re-adjust the threshold value.

The maximum proximity effective value d in the present invention has the following significances:

1) At the moment of putting through the call, the value detected by the proximity sensor is compared with the maximum proximity effective value; if the former is greater than the latter, then the proximity threshold value f1=a+x does not work, thus preventing the screen from turning off. In the beginning of making a call, a hand or an object may easily approach or shade the proximity sensor. If the screen turns off at this moment, the user feels that the screen always turns off at the moment of putting the call through and that the operation is very inconvenient. By setting the maximum proximity effective value, the above problem can be solved. At the moment of putting the call through, on condition that the distance between the hand or object and the proximity sensor is small enough, the proximity threshold value is the full range value, and the screen will not turn off. Then, return to step 2.

2) During the call, if the object approaches to the proximity sensor as slowly as possible and does not meet the proximity trend, the original proximity threshold value does not work and the screen will not turn off. Only when the object is close enough and the value detected by the proximity sensor is greater than the maximum proximity effective value, the set proximity threshold value f1=a+x does work and then the screen will turn off; otherwise, the system will re-adjust the threshold value.

The proximity compensation value x and departure compensation value y, those two parameters affect the proximity threshold value and the departure threshold value. The setting of those two parameters is required to meet the requirements for high anti-interference (oily skin, greasy dirt) and solve the problem of hair proximity. Usually, the relation between those parameters and the proximity trend is: y≤c≤x. x cannot be too big; otherwise, the screen does not turn off when the hairs approach the proximity sensor at a slow speed. y cannot be too small; otherwise, the screen will not turn on if the screen, corresponding to the proximity sensor, is contaminated with greasy dirt brought by the oily skin; meanwhile, y cannot be too big to solve the problem of hair proximity. Those two parameters shall be obtained by numerous tests.

In said step 2, step 5 and step 7, ADC instant values are read at least two consecutive times respectively. In this embodiment, in said step 2, step 5 and step 7, ADC instant values are read for three times respectively.

Infrared sensing is a kind of noncontact gesture approach rolling technology. By simple gesture, the electronic device can quickly sense the approach of the user without the actual touch. During the call, the detection algorithm of the present invention detects the value received by the photoelectric diode by the actual variation trend of the energy received by the photoelectric diode as the evidence of approach detection and judges the proximity or departure action according to the variation trend to control the touch screen of the mobile phone to turn on and off.

I2C is the abbreviation of Inter-Integrated Circuit, which is a bus structure. I2C is used as the complementation of the Inter-IC. This kind of bus is used for connecting the microcontroller and the peripheral devices for a bus standard widely adopted in the microelectronic communication control field. I2C is a multidirectional control bus, which means that plural chips can be connected to the same bus structure while each chip can be used as a control source for implementing data transmission. This simplifies the signal transmission bus.

ADC is the abbreviation of Analog-to-Digital Converter. When the value detected by the infrared proximity sensor reaches the maximum limit, the corresponding ADC value output by the sensor is called ADC full range value.

The algorithm of the present invention adopts the method of adjusting the proximity and departure threshold values in real time during the call. By continuously adjusting the proximity and departure threshold values during the call, the set threshold values work only when meeting certain conditions. For mobile phones with the same structure design, this algorithm can prevent the influences of the component consistency, structural consistency and other outside interference factors on approach detection, so the algorithm system always keeps consistent in judgment on the proximity and departure actions of the same object. This algorithm is widely applicable and is not required to set a unique approach and departure threshold values for each mobile phone.

The embodiment above cannot be regarded as a limit of the utility model. Without departing from the inventive concept of the utility model, any substitution is in the protective scope of the utility model.

What is claimed is:

1. A detection algorithm for an infrared proximity sensor of a touch screen mobile phone, based on infrared proximity sensing technology, said detection algorithm being switched on along with the startup of a call function of the mobile phone and immediately switched off at the moment when a call is cut off; said detection algorithm comprising:

step 1, initiating a proximity value a, giving an ADC (Analog to Digital Converter) full range value to the infrared proximity sensor, meanwhile setting a proximity threshold value f1 of a system of the mobile phone as the ADC full range value and a departure threshold value f2 as 0;

step 2, reading ADC instant values output by the infrared proximity sensor and averaging the values to get an instant mean value b;

step 3, judging if $b<a+c$ and $b<d$, executing step 4; otherwise, executing step 5, wherein c represents proximity trend value; d represents a maximum proximity effective value; c and d both are system set values;

step 4, giving a new value to a to make $a=b$, adjusting the proximity threshold value f1 to $a+x$, writing the proximity threshold value f1 through an I2C (Inter-Integrated Circuit) operation register, wherein x is a proximity compensation value set in the system, and $c \leq x < 2c$;

step 5, reading ADC instant values, meanwhile judging if the ADC instant values are all greater than the proximity threshold value f1, if so, entering step 6; otherwise, returning to step 2;

step 6, reporting a proximity event, turning off a touch screen of the mobile phone to allow the touch function to sleep, adjusting the departure threshold value f2 of the system to $a+y$, and writing the departure threshold value f2 through the I2C operation register, wherein y is a departure compensation value set in the system, and $0<y \leq c$;

step 7, reading the ADC instant values, meanwhile judging if the ADC instant values are all smaller than the departure threshold value f2 set in step 6, if so, entering step 8; otherwise, repeating step 7;

step 8, reporting a departure event, turning on the touch screen, waking up the touch screen and turning to step 2.

2. The detection algorithm for an infrared proximity sensor of a touch screen mobile phone according to claim 1, characterized in that, said proximity trend value c, maximum proximity effective value d, proximity compensation value x and departure compensation value y are all fixed values, adjusted according to the system.

3. The detection algorithm for an infrared proximity sensor of a touch screen mobile phone according to claim 2, characterized in that, in said step 2, step 5 and step 7, ADC instant values are read at least two consecutive times respectively.

* * * * *